United States Patent [19]
Cox, Jr.

[11] 3,964,772
[45] June 22, 1976

[54] CONNECTOR FOR FLEXIBLE METALLIC CONDUIT AND METHOD

[75] Inventor: John A. Cox, Jr., Sycamore, Ill.

[73] Assignee: Ideal Industries, Inc., Sycamore, Ill.

[22] Filed: May 17, 1971

[21] Appl. No.: 143,896

Related U.S. Application Data
[63] Continuation-in-part of Ser. No. 818,905, April 24, 1969, abandoned.

[52] U.S. Cl. ................................. 285/39; 29/437; 29/456; 228/154; 285/161; 285/174; 285/251; 285/286; 285/331; 285/424
[51] Int. Cl.² ..................................... F16L 35/00
[58] Field of Search ............... 285/245, 41, 39, 174, 285/242, 251, 149, 331, 161, 287, 175, 286, 424; 29/157 R, 157 A, 437, 470, 456, 463, 5; 228/153, 154

[56] References Cited
UNITED STATES PATENTS

| | | |
|---|---|---|
| 1,440,508 | 1/1923 | Todd .............................. 285/174 X |
| 2,793,830 | 5/1957 | Nokaji et al. .................... 285/161 X |
| 3,441,296 | 4/1969 | Wilkin ............................ 285/245 X |
| 3,542,406 | 11/1970 | Metcalf.......................... 285/390 X |

FOREIGN PATENTS OR APPLICATIONS

| | | |
|---|---|---|
| 515,628 | 2/1955 | Italy .................................... 285/251 |
| 820,113 | 9/1959 | United Kingdom................. 285/354 |

Primary Examiner—Dave W. Arola
Attorney, Agent, or Firm—Kinzer, Plyer, Dorn & McEachran

[57] ABSTRACT

This is concerned with a fabricated connector, and method of making it, for joining flexible conduit to a terminus, such as a box or enclosure or the like. The connector has a sheet metal fabricated housing that free-wheels on the flanged end of a body member and is provided with a threaded pilot that is adapted to project into the inside of the end of the flexible conduit.

12 Claims, 14 Drawing Figures

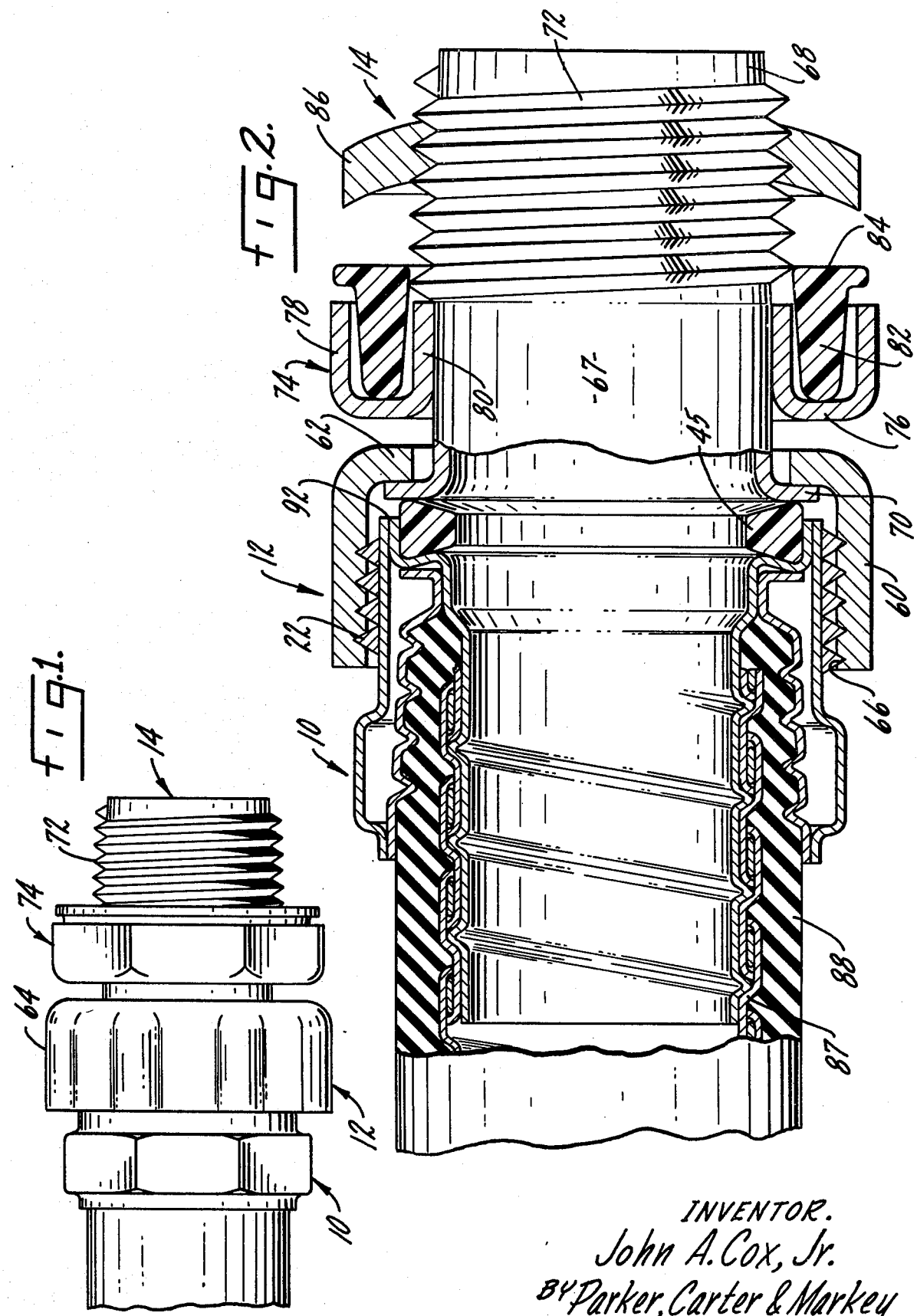

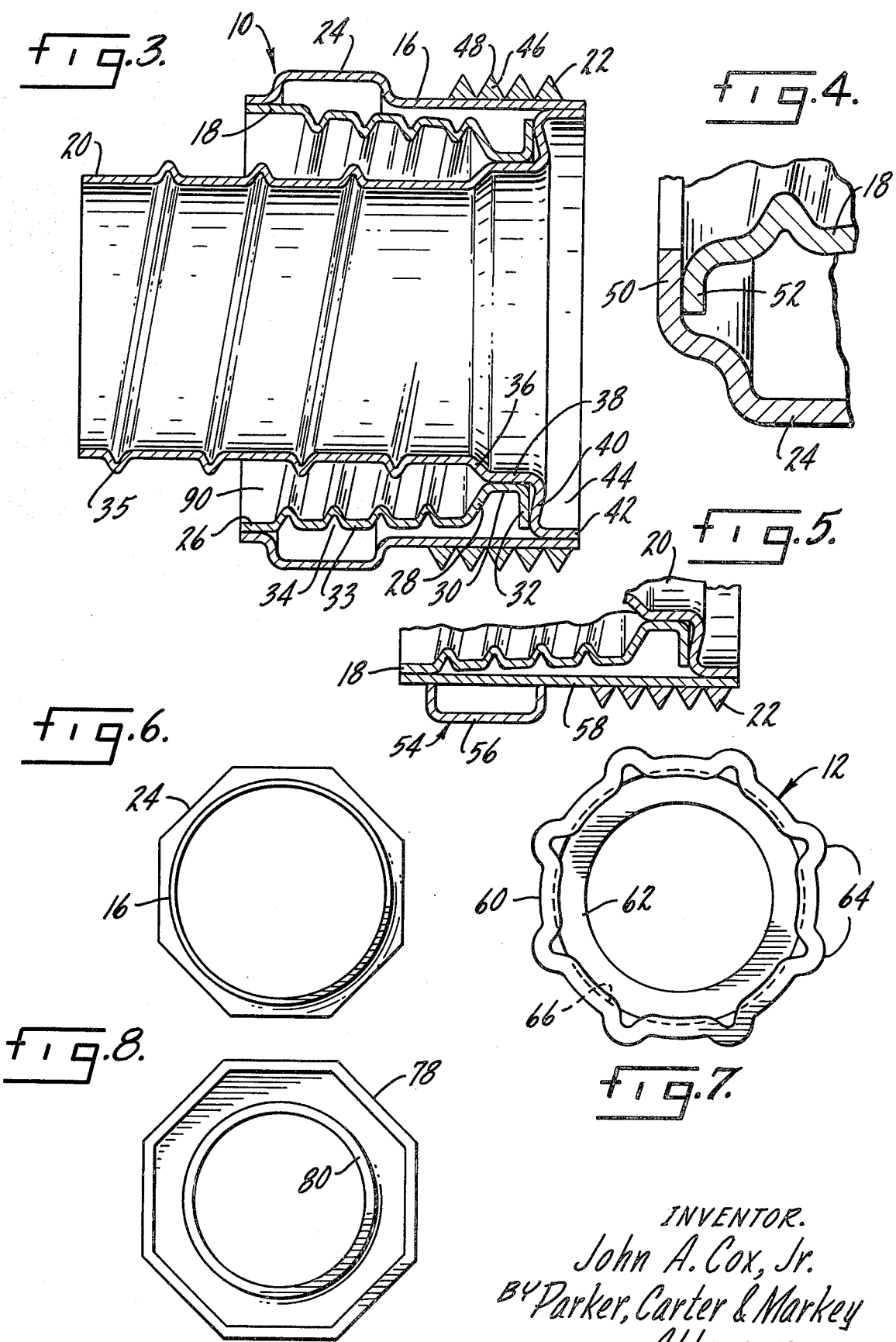

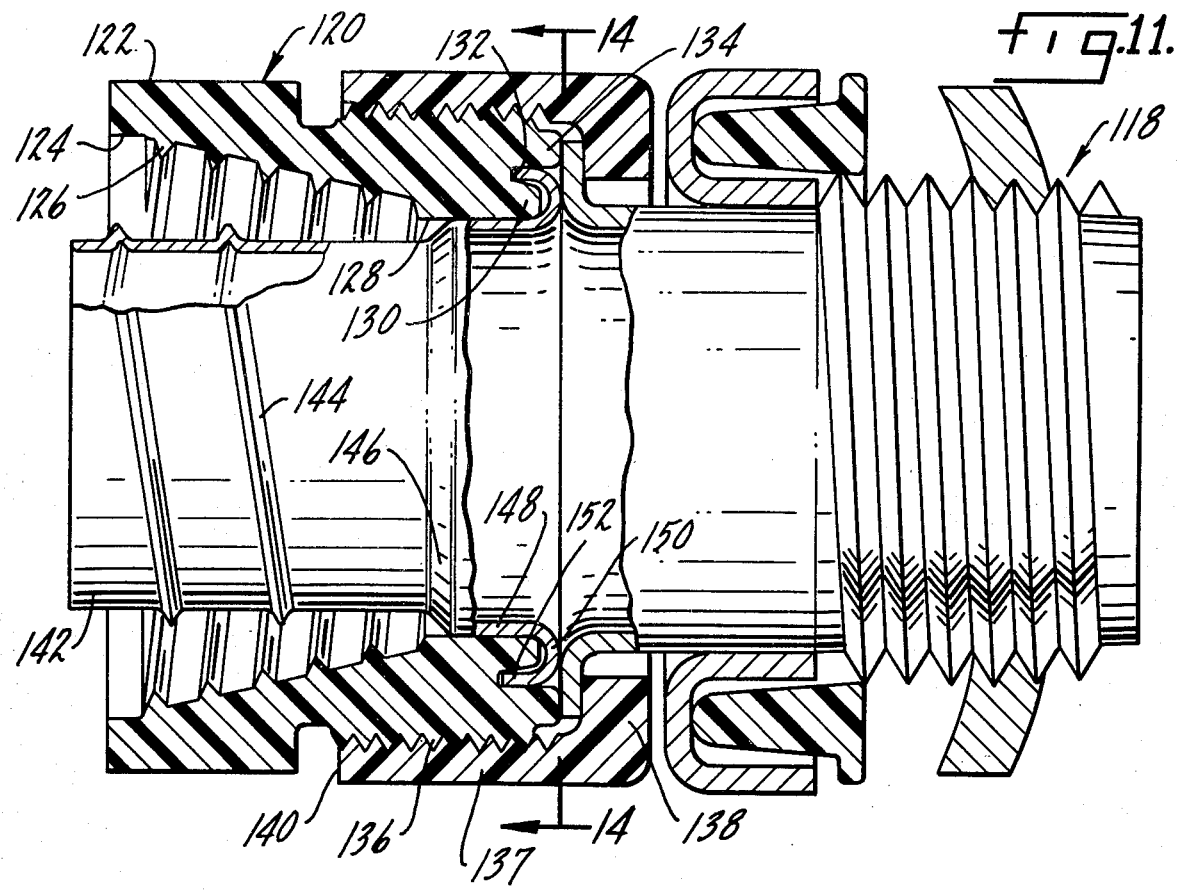
fig.11.
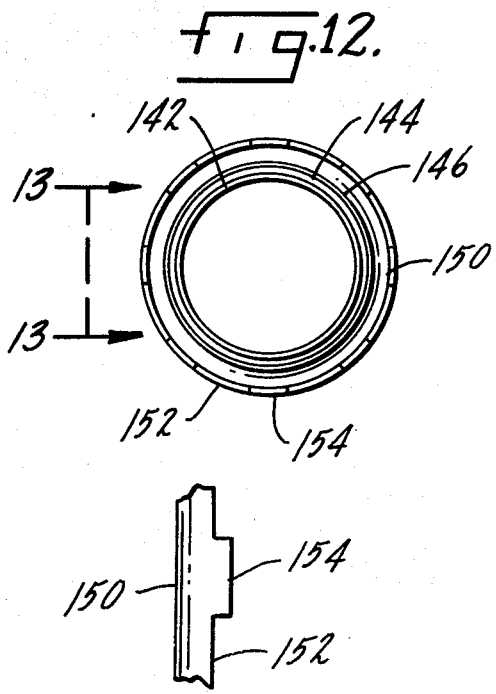
fig.12.
fig.13.
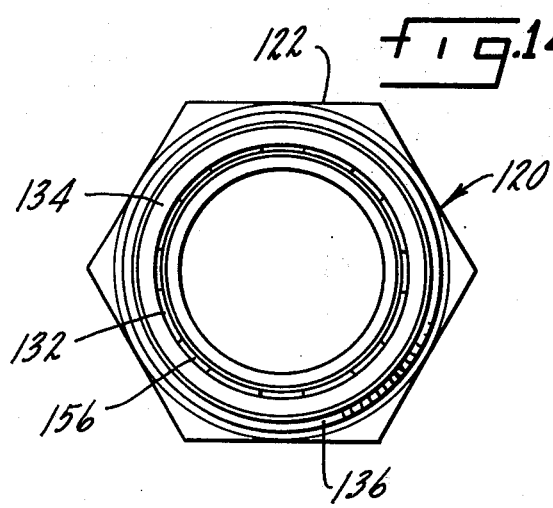
fig.14.
INVENTOR.
John A. Cox, Jr.
BY Parker, Carter & Markey
Attorneys.

3,964,772

CONNECTOR FOR FLEXIBLE METALLIC CONDUIT AND METHOD

This is a Continuation-in-part of co-pending application, Ser. No. 818,905, filed Apr. 24, 1969, and now abandoned.

SUMMARY OF THE INVENTION

This invention is concerned with a connector for joining flexible conduit to a terminus, such as an electrical junction box or the like, and is also concerned with a method of making such a connector.

A primary object of the invention is a fabricated flexible conduit connector.

Another object is a method of making a fabricated flexible conduit connector.

Another object is a method of fabricating a flexible conduit connector to avoid the expense of casting and machining such a connector.

Another object is a method of making a flexible conduit connector by press and brazing operations.

Another object is a method of making a lightweight inexpensive flexible conduit connector.

Another object is a flexible conduit connector which insures a tight grip and seal on the end of flexible conduit.

Another object is a moisture- or liquid-tight seal in a flexible conduit connector of the above type.

Another object is a free-wheeling connection between the flexible conduit connector and its body member which mounts on the box or terminus.

Another object is a method of making a connector of the above type which avoids the majority if not all machining.

Another object is a connector of the above type which compresses the outer elastic jacket on flexible metallic conduit in a manner that provides a tight seal.

Another object is a free-wheeling connector of the above type for flexible metallic conduit which meshes the threads on the pilot with the threads normally found on the metal core in flexible metallic conduit.

Another object is a connector of the above type which compresses and grips the outer elastic jacket of the conduit in a manner which provides a seal and also prevents the jacket from tearing away.

Another object is a connector of the above type which is made partially out of plastic.

Another object is a connector specifically intended for shop installation.

Other objects will appear from time to time in the ensuing specification and drawings.

BRIEF DESCRIPTION OF THE DRAWINGS

FIG. 1 is a side view of a connector assembly;

FIG. 2 is a section of FIG. 1, on an enlarged scale and partly in full;

FIG. 3 is the fabrication portion of FIG. 2 with other parts removed;

FIG. 4 is an enlarged part of a modification of FIG. 3;

FIG. 5 is part of a modification of FIG. 3;

FIG. 6 is an end view, on a reduced scale, of the outer housing in FIG. 3;

FIG. 7 is an end view, on a reduced scale, of the housing nut in FIG. 2;

FIG. 8 is an end view, on a reduced scale, of the octagon ring in FIG. 2;

FIG. 11 is a section, like FIG. 2, of a further modification;

FIG. 12 is an end view of a part of FIG. 11;

FIG. 13 is a view taken generally along line 13—13 of FIG. 12, on an enlarged scale; and FIG. 14 is a view of the housing taken generally along line 14—14 of FIG. 11, on a reduced scale.

DESCRIPTION OF THE PREFERRED EMBODIMENT

Figure 9:
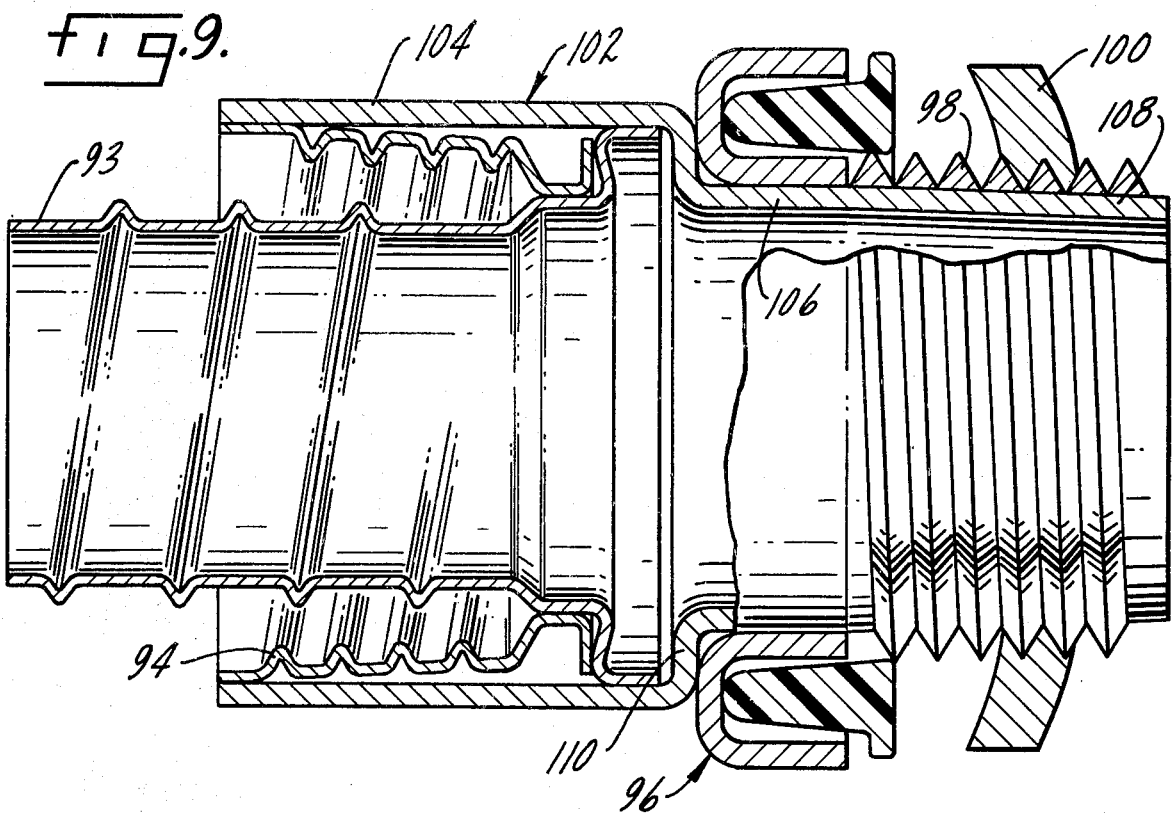
FIG. 9 is a section, similar to FIG. 2, of a modified form.

In FIGS. 1 and 2 a connector for flexible metallic conduit is shown and includes a housing or adaptor 10, a housing or adapter nut 12 and a body member 14, each of which will be explained in detail.

Considering first the housing or adapter 10, in FIG. 3 it has been shown separate from the other parts and is made up as shown of four main parts, an outer housing 16, an inner housing 18, an insert 20 and a thread form 22. The outer housing 16 may be made in a press operation from a flat sheet going through, for example an eyelet-type press where it is drawn into the cylindrical shape shown. An octagon section 24 providing a plurality of flat sides on the outside may be expanded inside the cylinder with the resulting overall part being generally cylindrical and having approximately the same diameter at each end with the octagon 24 closer to one end than the other.

The inner housing 18 may also be made in a press operation from a flat sheet that is drawn into a generally conical shape which tapers from a large end 26 to a small end 28 which is brought into the short cylinder 30 followed by a flared-out flanged or lip 32. Threads 34 in the nature of grooves or wrinkles may be rolled into the tapered area 33 to provide threads on the inner surface with a certain pitch. The large end 26 is dimensioned to fit snugly inside of the outer housing or sleeve with metal-to-metal contact. Preferably the small end has a slight cylindrical portion 30 which, as explained hereinafter, has metal-to-metal contact with a portion of the pilot.

The pilot 20 has a rolled thread 35 of a certain pitch in its main cylindrical portion which is flared out toward the inner end, at 36, into a cylindrical portion 38 that is metal-to-metal with portion 30 on the small end of the inner housing. The pilot is then flared out at 40 to a cylindrical edge 42 which is at a diameter that it will fit metal-to-metal inside of the outer housing 16. If the outer housing is cylindrical and of a constant diameter, except for the octagon 24, then the portion 42 of the pilot may be the same diameter as the big end 26 of the inner housing which greatly facilitates assembly.

The flare 40 and cylindrical portion or ledge 42 define an annular seal seat area 44 for an annular seal ring 45, as shown in FIG. 2.

The thread form on the outside of the housing 22 may be formed by coiling a wire 46 of suitable length into a generally cylindrical coil and then slipping it over the outer housing. The wire is shown as having a triangular cross-section with one flat side being disposed on the inside of the resulting coil so that the inner surface of the coil presents a smooth cylindrical appearance with the outer edge or point 48 of the triangle forming the crest of the resultant thread. Wire that is triangular in cross-section is particularly appropriate since the sides or flanks of the threads resulting from the triangle will be at 60° which is appropriate for pipe threads.

The wire may be coiled to an internal diameter that is slightly smaller than the outside diameter of the outer housing 16 so that when the cylindrical inner surface of the coil is slipped onto the outer housing, the coil must be slightly expanded first which will thereby give a slight compression or loaded fit. The degree of interference should be sufficiently small such that no great effort is necessary to assemble the two.

In the variant form shown in FIG. 4, the left end of the outer housing is turned in, at 50, to match and engage a flared out portion or flange 52 at the large end of the inner housing. This is a modification of the area at the large end 26 in FIG. 3. In the FIG. 4 form, this will give metal-to-metal contact between these two flanges which, in certain applications, is preferable and has an advantage in assembly.

In FIG. 5 a variant form has been shown in which the octagon instead of being pressed out in the outer housing, is formed as a separate piece 54 which is U-shaped in cross-section and has an octagon outer surface 56 with two legs each of which terminates in a circular inner edge of a diameter to contact the outer surface of the outer housing. The advantage of this arrangement is that the outer housing 58, in this form, can be made as a straight cylindrical section and does not require orientation in assembly.

The housing or adapter nut 12 starts out as a flat sheet and may be run through a progressive die so that it has a generally cylindrical exterior 60 with a flange 62 at one end and is pinched on the exterior to provide a plurality of outstanding ribs 64, shown as 8 in the case of FIG. 7 to provide grip. The inner surface of the cylindrical portion 60 is threaded, as at 66, to mesh with the thread form 22 on the fitting.

The body 14 may be made in a manner that is the same as or similar to what is shown and described in prior U.S. Pat. No. 3,542,406, issued Nov. 24, 1970, and assigned to this assignee. The body may be drawn from flat or rolled stock into a generally cylindrical shape 67 with a taper 68 on one end and a flange 70 on the other. A thread form 72 may be on the taper 68 and may be made like the thread form 22 on the connector. A combination octagon and seal 74 is positioned on the body and may take the form of an annular retainer 76 which is C-shaped in cross-section, as shown in FIG. 2, with an outer leg 78 that is an octagon and an inner leg 80 that is cylindrical. The interior of the octagon may be open toward the thread 72 and may be fitted with a seal or grommet 82 which is tapered into the octagon but extends beyond the open end to a flat face 84 which engages and seals against the wall or side of a housing or junction box. The thread 72 may be provided with the usual lock nut or washer 86.

In assembly the body 67 is first drawn. The coil wire spring 72 is then slipped onto the taper. The octagon and seal retainer 74 is then slipped over the cylindrical part as is the housing nut 12. Then the end of the body is flanged at 70. Then, as a unit, the assembly may be furnace brazed or otherwise secured.

Braising the various fabricated parts can be easily and simply accomplished by coating the braze material on some or all of the parts. For example, referring to FIG. 3, the insert 20, the inner housing 18, and the thread or wire 22 may be substantially, completely or partially coated with braze material prior to assembly. This has the advantage that all contacting surfaces between adjacent parts will be fused with braze material without requiring precision spotting of braze material on certain areas of certain parts.

Connectors of this general type are intended for joining flexible metallic conduit to a terminus such as a terminal, box or what have you. Flexible metallic conduit is indicated generally in FIGS. 1 and 2 and conventionally has a metallic coil interior 87 with a neoprene or rubber-like exterior sleeve or insulation 88. The metallic interior 87 is normally made in sections so that it provides a simulated thread form which is old and well-known. The present connector has the advantage that this thread form can be duplicated on the pilot 20 so that when the pilot is inserted in the end of the conduit it will mesh with the threads of the metal core 87 and when turned, the conduit will be drawn into the tapered compression chamber 90 defined between the outside of the pilot and the inside of the taper 33 on the inner housing 18. The pilot may act as a ground. The thread form 34 on the tapered inner housing will then groove the somewhat distortable insulating cover 88 on the conduit or dig in to provide a tight grip as well as affecting some distortion and elongation of that covering, as shown in FIG. 2. The result is that the fabricated assembly of FIG. 2 will be fully and firmly mounted on the end of the conduit and a moisture-tight joint will result.

In the form shown in FIG. 9 the unit does not have the free-wheeling feature but rather has a unitary rigid housing from one end to the other. The insert 93 which becomes the pilot, the inner housing 94, the octagon and seal combination 96, the male threads 98 and lock washer 100 may all be the same. The outer housing 102 is made from a somewhat thicker piece or sheet and is divided generally between a large diameter half 104 and a small diameter half 106 which may taper somewhat in the area 108 under the threads. The shoulder 110 may be more or less midway between the end and may serve as a stop for the insert 93 and inner housing 94 from one end and for the octagon 96 from the other end. The outer housing 102 may also be made in a press operation, for example, an eyelet-type press, from a flat sheet that is drawn into the shape shown. All parts may be coated with braze materials, assembled, and brazed at once which, in the case of FIG. 9, would include everything except the seal and lock washer 110.

Figure 10:
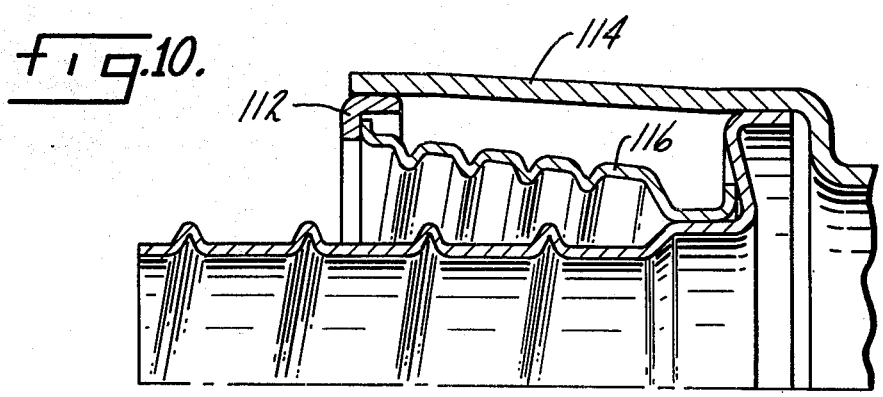
FIG. 10 is a modification of a part of FIG. 9.

FIG. 10 is a part of a modification and shows an insert 112, generally L-shaped in cross-section, and positioned between the outer housing 114 and the large end of the inner housing 116 which functions as a filler and a guide for the outer surface of neoprene cover of the flexible metallic conduit. The FIG. 10 form is intended specifically for a different size conduit and allows standard parts and tooling to be used throughout most if not all of the line.

FIGS. 11–14 are a further modification in which the body unit 118 including the body itself, the male threads, the octagon and seal, and the lock washer may all be the same. The housing unit on the other end of the body unit, indicated generally at 120, however is made primarily out of plastic and includes an octagon formation 122 in the nature of a series of flats on the outer surface toward the open end thereof with a tapered inner wall 124 having a thread formation 126 thereon toward the interior. It will be noted that the threads 126 are V-shaped and somewhat sharp and quite widely spaced which is to say with a substantial pitch with the taper terminating in a cylindrical surface 128 which is rounded outwardly at its rear end into a mounting shoulder 130 which terminates outwardly in an annular groove 132. Surrounding this groove is another shoulder 134 which is generally annular and extends axially beyond the inner shoulder 130. A threaded cylindrical surface 136 on the outside, somewhat smaller in diameter than the octagon surface 122, provides a mounting for a plastic housing nut 137 which has a flange 138 at one end and terminates as at 140 at its other end short of the octagon so that the housing 120 may be turned freely in or out in the nut.

A metal pilot 142 in the nature of an insert projects slightly beyond the open front end of the housing and has a cylindrical portion extending rearwardly with threads 144 therein, similar to the threaded pilots explained in the previous forms. The inner end of the pilot tapers out at 146 to a cylindrical part 148 which is curved outwardly at 150 and back at 152 to provide a mounting rim that extends into the groove or depression 132 in the housing. The edge of rim 152 is made irregular in the form of teeth or projections 154 which match corresponding indentations 156 in the bottom of groove 132.

The proportioning is such that the pilot may be slipped in the plastic housing, from right to left in FIG. 11, with mounting rim 152 of the pilot inserted into the groove 132 in the housing. The teeth 154 on the edge of the pilot rim will project into the notches or depressions 156 in the bottom of the groove so that the two will be interlocked against relative rotation. They can then be permanently secured by gluing, ultrasonic welding or otherwise so that they become, in effect, an integral unit.

The use, operation and function of the invention are as follows:

The connectors shown, and the various modifications, are all primarily intended for joining flexible metallic conduit to a terminus such as a box, panel or what-have-you. This is not to say that certain features of the invention are not applicable to and usable with other types of conduit. But the majority of the important aspects of the invention are concerned with flexible metallic conduit.

In the form shown in FIGS. 2 and 3 and related figures, the unit is basically all metal. The pilot is first inserted into the end of the conduit and the threads on the pilot mesh with the simulated threads formed in the metal core sleeve inside of the rubber or neoprene cover on the conduit. Rotating of the housing will pull the tapered compression chamber down on the end of the conduit with the tapered area inside of the housing contacting and deforming the flexible covering inwardly and forwardly. The threads on the tapered area smoothly indent and lock into the insulation without cutting or fracturing it. When fully mounted, a portion of the cover will have been extruded forwardly to some degree and, as shown in the FIG. 2 form, has been illustrated as moving forward beyond the end of the metal core and filling the small end of the compression chamber.

Referring to the FIG. 2 form, when the housing nut 12 is loose on the flange 70 of the body, the adapter 10 and nut 12 will rotate freely or free-wheel on the flange 70 on the end of the body portion. The pilot can be inserted into the end of the flexible conduit and the fitting and nut turned freely by hand or by a wrench on the octagon 24 or 56. During this turning the adapter and nut will free-wheel on the body flange 70. When the adapter is fully and firmly tightened and seated on the end of the conduit, the nut 12 can be turned to draw the seal 45 fully and tightly against the flange 70. At the same time that a tight-moisture seal is acquired, the housing or adapter will be fully and firmly mounted rigidly on the body 14. The lock nut 86 can be removed and the threaded taper 68 inserted into an opening in the box or junction. The lock nut or washer 86 may be again mounted on the inside and turned so as to pull the flat face 84 of the seal 82 up against the exterior of the housing.

The advantage of a unit of this type, and the method of making it, is that it is much less expensive and faster. The housing as shown in FIGS. 3, 4 and 5 can be fabricated. After each part is made, they can be assembled in the proper order and furnace brazed so as to get a unitized dimensionally-stable part. Previously such connectors have been cast and machined which is expensive and time-consuming. The present connector can be made in a press operation at quite high speeds. Further, the parts can be assembled by automatic equipment and then automatically taken to the brazing furnace. The resulting fitting, housing nut and body will be much lighter in weight than machined parts.

The body 14 is similar to what is shown in prior U.S. Pat. No. 3,542,406 but has the advantage that the octagon and seal is made in a combination. While I have shown the body element as being straight and made with a one-piece sleeve, it should be understood that it may be made with a 45° or 90° or at any angle bend and in two parts as shown and described in U.S. Pat. No. 3,542,406.

In all forms shown the pitch of the threads on the pilot is preferably the same as the pitches of the threads in the tapered portion so that as the pilot draws the conduit in, the tapered threads will flow smoothly into the flexible covering on the conduit and will not tend to tear or rip it. If the external threads on the pilot are considered single-start thread, then the internal threads in the housing may be considered a multiple-start thread, although they may be the same. When the pilot is inserted and rotated so that its external threads mesh with the internal grooves in the conduit, the conduit will be automatically advanced giving a smooth engagement of the internal tapered threads on the housing with the flexible covering on the conduit.

When the housing nut is rotated so as to close on the thread 66, the housing will be drawn in pressing seal 45 until the edge of the housing 92 contacts the flange 70 on the body which provides a limit to the compression applied to the seal.

One of the advantages of the free-wheeling feature of the housing and housing nut on the body is that the assembly can be easily and quickly seated on the end of the flexible conduit without disassembly. The housing and housing nut can be broken apart to allow these two parts to freely rotate on the flange of the body. The pilot or insert can then be turned into the end of the conduit by wrenching the octagon on the outer housing with the housing nut rotating in unison therewith. When the end of the conduit is fully seated in the converging compression chamber 90, the wrench can be switched to the housing nut to draw the two parts together tightening against the seal 45.

In certain installations the free-wheeling aspect of the fitting and housing nut have the advantage that they can be disassembled and the fitting 10 can be mounted separately in the end of flexible conduit on a separate or preliminary basis. For example, a number of body elements and housing nuts could be assembled on boxes or junctions. A number of fittings, such as shown in FIG. 3, could be pre-inserted into select lengths of flexible metallic conduit and brought to the job site en masse with the connections to be made there.

FIG. 9 does not have the free-wheeling feature and is intended for factory or shop installation where a substantial number of lengths of flexible metallic conduit have been cut to a predetermined size and will be installed at the job site in those lengths. The connector of FIG. 9 would be screwed down on the end of the conduit lengths at the shop and, possibly with some sort of plastic cap to protect the threads, would be taken to the job site and installed. The FIG. 9 form could be made by the same press, brazing, etc. operation as explained in connection with FIG. 3.

The form of FIG. 10 is intended for a specific size of flexible metallic conduit and in a sense is a modification or adaptation of standard parts taken from the previous form which will allow for common tooling.

The form of FIGS. 11–14 is basically plastic and may be rigid polyvinylchloride, glass-filled nylon or the like. In addition to a substantial savings in the cost of manufacture, it also has the advantage that the thread form on the tapered interior of the housing may be quite precise which, for certain applications, can give a better connection and smoother fit around the neoprene or rubber cover on the flexible metallic conduit. It is preferred in the plastic form of FIG. 11 that the pilot or insert be of metal so that a ground connection is provided. The FIG. 11 form also has the advantage that the seal in the housing can be an integral part of the fitting.

The invention has the advantage that it is the soft flexible cover of the metallic conduit that is being compressed inwardly with the metal core being fully supported by the pilot which functions as an anvil for the compression effect on the cover. This is by way of comparison to connectors of this general type which attempt to expand the inside of the flexible metallic conduit outwardly which, due to the resistance to expansion of the metal, is difficult to do and at best results in an inferior connection. Further, the threaded compression effected on the outer deformable covering of the conduit is such that any tendency thereafter of the cover material to cold flow will be counteracted by the threads from the outside of the compression chamber which take a firm bite or grip on the conduit covering so that the seal effected, rather than being purely circular, takes the form of a helical spiral.

In the FIG. 11 form, the plastic of the fitting may be conventional but it should be compatible with the plastic rubber or neoprene used as the outside cover on the flexible metallic conduit.

In all forms of the invention, very little if any machining is necessary. Nor are any die-cast parts required. So the expense of the device is substantially reduced over well-known units.

While I have referred to certain parts as being in the shape of an octagon, it should be understood that they may have any number of sides. An octagon, however, is quite common in this field.

While the preferred form and several variations of my invention have been shown, described, and suggested, it should be understood that suitable additional modifications, changes, substitutions and alterations may be made without departing from the invention's fundamental theme.

I claim:

1. A body member for use in joining a connector for flexible conduit to a terminus, including a tubular sleeve with a thread form on the exterior of one end for connection to a terminus and a mounting at the other end for joining a connector, a octagon on the outside of the sleeve having a hollow annular interior opening toward the thread form, and an annular seal in the hollow of the octagon extending beyond the opening thereof so as to engage and seal against the wall of the terminus when the said one end of the sleeve is inserted through an opening in the terminus, the octagon being U-shaped in cross section with inner and outer flanges, the inner flange being circular and brazed to the outer surface of the sleeve, and the outer flange being in the form of a octagon.

2. A method of making a connector for flexible conduit having a generally cylindrical housing with an open interior and a generally centrally located pilot projecting therefrom, including the steps of defining the outside and the inside of the housing with separate generally cylindrical outer and inner sheet metal parts, tapering the inner sheet metal part from a diameter at one end matching the diameter of the outer sheet metal part to a reduced diameter at the other end, defining the pilot with a third generally cylindrical sheet metal part having a diameter on the order of the reduced diameter of the inner sheet metal part, positioning all three sheet metal parts in generally concentric relation, and braising all three parts together at their contacting surfaces.

3. The method of claim 2 further characterized by and including the step of expanding a generally annular octagon section outwardly in the outer sheet metal part prior to positioning and braising all three parts together.

4. The method of claim 2 further characterized by and including the step of positioning an octagon ring around the outside of the outer sheet metal part and braising it along with the other parts at their contacting surfaces.

5. The method of claim 2 further characterized by and including the step of coiling a length of wire into a generally cylindrical coil with the cross-section of the wire being generally triangular so that one side of the triangle will be on the inside of the resulting coil, sliding the coil on one end of the outer sheet metal part, and braising it to the outer sheet metal part at the same time that the other parts are braised to form a thread form on one end of the resulting connector.

6. The method of claim 2 further characterized by and including the step of deforming the tapered area of the inner sheet metal part into a thread form prior to positioning and braising so that the tapered thread form will engage the exterior of the flexible conduit in use.

7. The method of claim 2 further characterized by and including the step of deforming the generally cylindrical sheet metal pilot part into a thread form prior to assembly and braising so that the thread on the pilot will engage the interior of the flexible conduit.

8. The method of claim 2 further characterized by and including the step of flaring the other end of the pilot into an annular seal seat prior to assembly and braising.

9. The method of claim 2 further characterized by and including the step of extending the outer housing a substantial axial distance beyond the inner ends of the inner housing and pilot, and forming the extended part of the outer housing into a joint to be inserted into and joined to a terminus.

10. A method of making a connector for flexible conduit having a generally cylindrical housing with an open interior and a generally centrally located pilot projecting therefrom, including the steps of defining the outer housing from a generally cylindrical sheet metal part, defining the pilot from a second generally cylindrical sheet metal part having a diameter substantially less than that of the housing part, flaring the inner end of the pilot part outwardly to a diameter approaching the inside diameter of the outer housing part, extending the outer end of the pilot a substantial axial distance beyond the end of the outer housing, deforming the generally cylindrical sheet metal pilot extended end into a thread form, positioning the sheet metal outer housing and pilot in generally concentric relation, and brazing the two parts together at their contacting surfaces.

11. The method of claim 10 further characterized by and including the step of forming the extended part of the outer housing into a joint to be inserted into and joined to a terminal.

12. The method of claim 10 further characterized by and including the step of extending the outer housing a substantial axial distance beyond the inner end of the pilot.

* * * * *